United States Patent Office 2,840,543
Patented June 24, 1958

2,840,543

ARTIFICIAL RESIN FROM FURFURYL ALCOHOL, FORMALDEHYDE, AND MAGNESIUM SULFATE, AND PROCESS OF MAKING THE SAME

Lloyd H. Brown, Oak Park, Edward A. Reineck, Highland Park, and Peter G. Huett, Chicago, Ill., assignors to The Quaker Oats Company, Chicago, Ill., a corporation of New Jersey No Drawing. Application July 29, 1953
Serial No. 371,151

10 Claims. (Cl. 260—67)

The present invention relates to an artificial resin made from furfuryl alcohol, formaldehyde and magnesium sulfate, and also to the process by which it is produced.

It has long been known that furfuryl alcohol and formaldehyde can be condensed under the influence of suitable catalysts, with the production of resinous substances which were either liquids or solids, and which, by appropriate further reaction, such as by heating, could be converted into ultimately insoluble and infusible resinous materials.

It is one of the objects of the present invention to produce a still liquid but viscous condensation product of furfuryl alcohol, formaldehyde and magnesium sulfate, which may subsequently be transformed into an infusible and insoluble solid.

It is a further object of the present invention to provide a method for the condensation of furfuryl alcohol and formaldehyde in which the hydrogen-ion concentration is quite low, in any event lower than about pH 4.0.

Other objects of the present invention will become apparent from the further description hereinbelow.

In carrying out the present invention, furfuryl alcohol is mixed with formaldehyde in the proportion of one mol of the former to about 0.6 mol of the latter; but it is preferred to use the formaldehyde in an anhydrous form, namely as paraformaldehyde, which is the polymer of formaldehyde and has the formula $(CH_2O)_n$. The paraformaldehyde dissolves in the furfuryl alcohol when the mixture is heated. The mixture is then adjusted as to its hydrogen-ion concentration so that it will not be more acidic than corresponds to about pH 5; whereafter sufficient anhydrous magnesium sulfate ($MgSO_4$) is added to effect the desired condensation. From about 10% to about 40% by weight, as calculated on the furfuryl alcohol, may be used, and the mixture then heated at from about 98° C. to about 128° C. for from about 5 to 8 hours, in the presence of a liquid capable of carrying off the water formed.

Thus enough benzene is also added to aid in carrying off the water formed during the reaction. The resulting mixture of benzene vapor and steam is condensed, the water being trapped off in a Bidwell trap, and the benzene continuously returned to the reaction vessel.

*Example*

Actual proportions used were as follows:

400 grams furfuryl alcohol
73.3 grams paraformaldehyde
160 grams $MgSO_4$
200 ml. benzene At the conclusion of the operation residual furfuryl alcohol, formaldehyde and benzene were distilled off under a 12 millimeter vacuum at 130° C., leaving an oily liquid resin as the ultimate product. This had a viscosity of about from 120 to 200 centipoises; and could be further polymerized to form a hard, insoluble and infusible end product by further heating at, say, about 350° C., preferably in the presence of an appropriate amount of an acid. The reaction takes place at a hydrogen-ion concentration of about between pH 4 and pH 5, the slight increase in acidity being apparently caused by the formation of some levulinic acid. From analyses of the final distillate obtained it was ascertained that about 37% of the formaldehyde which had been added was used up in combining with the furfuryl alcohol to form the desired resin. The yield of liquid resin, when calculated back to the amount of original furfuryl alcohol used, varied between about 50% and 75%. As the unchanged furfuryl alcohol and the unused formaldehyde are recovered, the process becomes economical as both of these reagents can be reused. Any magnesium sulfate remaining in the liquid resin may be filtered therefrom, and therefore salvaged. The reaction between the furfuryl alcohol and the formaldehyde is accompanied by the splitting off of water, which is taken up by the anhydrous magnesium sulfate, but is substantially carried out of the reaction zone by azeotropic distillation with the benzene. Other equivalent organic liquids such as toluene may be used. The action of the magnesium sulfate as a catalyst at the low hydrogen-ion concentration at which the present process is conducted is attributable to its behavior as a dehydrating agent, and is not predicated upon any acidity or hydrogen-ion concentration.

Other equivalent dehydrating agents may be used in place of the magnesium sulfate, provided that they assert no deleterious action upon the resin formed, or would be counter-indicated for the eventual uses of the ultimate finished hardened resin products.

The proportions of formaldehyde and furfuryl alcohol are not critical, as the reaction, by reason of the mild conditions, is more or less self-controlling. Therefore any molar ratio of formaldehyde from about one-tenth mol to about 2 mols thereof may be used for each mol of furfuryl alcohol.

By reason of this ability to become hardened, the liquid resin of the present invention may be formulated into molding powders by admixture with suitable amounts of fillers, such as wood flour, asbestos, rotten-stone and the like. Such powders may then be cured in the usual type of pressure molds, as is well known in the plastics art. Some magnesium sulfate remains in the product and forms a part of it; but it is insufficiently acid to have any deleterious effects. Most of the magnesium sulfate, being insoluble in the resin, is readily filtered off, and thus removed from the resin.

The hydrogen-ion concentration of the finished liquid resin was determined by shaking it with an equal amount of water and measuring the pH of the liquid, which was found to be about pH 4.0.

The apparatus required for the carrying out of the present invention is of the simplest nature, comprising merely a suitable vessel provided with stirrers, and distillation equipment, and hence does not need illustration.

Inasmuch as the viscosity of the resin produced is variable, as by shortening or lengthening the time period of the heating step, the manufacturer can thus provide any desired viscosity demanded by the potential user of the resin. In general it may be stated that the range of viscosities may lie between about 120 to 200 centipoises; although a resin having a viscosity of 200 centipoises appears to be the most desirable; and it is this type of resin which will be produced by operating under the conditions above set forth. The amount of magnesium sulfate may be varied between 10% and 40%.

One of the particular advantages of the present process is that the reaction between the furfuryl alcohol and the formaldehyde can be carried out to such an extent that about 75% of the active materials are condensed, but without danger of driving the reaction too far. Thus, in the present case, the polymer formed is usually merely a liquid having a viscosity of about 200 centipoises, after the removal of free unreacted furfuryl alcohol, and even a prolonged reaction time does not carry the reaction substantially beyond this point, as would be the case with more active catalysts, such as acids.

Applicants claim:

1. Method of producing an artificial resin which comprises heating a mixture of furfuryl alcohol and formaldehyde in a ratio of from about 1/10 to 2 mols of formaldehyde per mol of furfuryl alcohol in the presence of about from 10 percent to 40 percent of anhydrous magnesium sulfate as a catalyst as calculated on the weight of the furfuryl alcohol to a temperature between about 98° and 128° C., the reaction being carried out at a hydrogen-ion concentration less than that equivalent to a pH of 4.0 and with continuous removal of the water formed as a result of the reaction.

2. Method of producing an artificial resin which comprises heating a mixture of about one mol of furfuryl alcohol and about 0.6 mol of formaldehyde to a temperature between about 98° C. and about 128° C. in the presence of about from 10% to 40% of anhydrous magnesium sulfate as calculated on the weight of the furfuryl alcohol, the reaction being carried out at a hydrogen-ion concentration less than that equivalent to a pH of 4.0, and with continuous removal of the water formed as a result of the reaction.

3. Method of producing an artificial resin which comprises mixing furfuryl alcohol and paraformaldehyde in a ratio of about 1/10 to 2 mols of formaldehyde equivalent of the paraformaldehyde per mol of furfuryl alcohol, adjusting the hydrogen-ion concentration of the mixture to between about pH 4 and pH 5, adding about 10% to about 40% of anhydrous magnesium sulfate as calculated on the weight of the furfuryl alcohol, and heating the mixture at about 100° C. in the presence of sufficient benzene to carry off the water of reaction until a resin having a viscosity, after removal of unchanged furfuryl alcohol, of about 200 centipoises has been formed.

4. An artificial resin capable of being converted to the insoluble and infusible stages and consisting of a condensation product of about one mol of furfuryl alcohol, about 0.6 mol of formaldehyde, about 10% to 40% by weight, as calculated on the weight of the furfuryl alcohol, and magnesium sulfate, and having a viscosity of about 200 centipoises said artificial resin having been formed with the continuous removal of water formed as a result of the reaction while said latter reactants were heated to a temperature between 98° and 128° C. at a hydrogen concentration less than that equivalent to a pH of 4.

5. Method of producing an artificial resin capable of being converted to the insoluble and infusible stages which comprises heating a mixture of furfuryl alcohol, paraformaldehyde and about from 10 percent to 40 percent of anhydrous magnesium sulfate as calculated on the weight of the furfuryl alcohol at a temperature above about 98° C. until a viscous liquid resin has been formed, said furfuryl alcohol and said paraformaldehyde being present in a ratio of about 1/10 to 2 mols of formaldehyde equivalent of the paraformaldehyde per mol of furfuryl alcohol, and distilling unconverted furfuryl alcohol and formaldehyde therefrom, the reaction being carried out at a hydrogen-ion concentration not over that equivalent to a pH of about 4, the reaction being carried out with continuous removal of the water of reaction formed.

6. Method of producing an artificial resin which comprises heating a mixture of about 400 parts by weight of furfuryl alcohol, 73.3 parts of paraformaldehyde, 160 parts of anhydrous magnesium sulfate and 200 parts of benzene at about 100° C., with return of benzene to the reaction mixture, until a resin has formed, distilling unchanged furfuryl alcohol and formaldehyde from the same, and continuously removing water formed as a result of the reaction, at a hydrogen ion concentration not over that equivalent to a pH of about 4.

7. Method of producing an artificial resin which comprises heating a mixture of furfuryl alcohol and formaldehyde within the range of about 1/10 mol to about 2 mols of formaldehyde to each mol of furfuryl alcohol in the presence of from about 10 percent to 40 percent of anhydrous magnesium sulfate as calculated on the weight of the furfuryl alcohol to a temperature between about 98° C. and about 128° C., the reaction being carried out at a hydrogen ion concentration less than that equivalent to about pH 4.0; and with continuous removal of the water formed as a result of the reaction.

8. An artificial resin capable of being converted to the insoluble and infusible stages and consisting of a condensation product of furfuryl alcohol and formaldehyde reacted, with continuous removal of water formed, in a ratio of from about 1/10 to 2 mols of formaldehyde per mol of furfuryl alcohol in the presence of from about 10 percent to 40 percent of magnesium sulfate as calculated on the weight of the furfuryl alcohol, while being heated to a temperature between about 98° and 128° C. at a hydrogen ion concentration not over that equivalent to a pH of about 4.

9. Method of producing an artificial resin which comprises condensing furfuryl alcohol and formaldehyde in the presence of about from 10 percent to 40 percent of anhydrous magnesium sulfate as calculated on the weight of furfuryl alcohol at a temperature above about 98° C. and at a hydrogen ion concentration not over that equivalent to a pH of about 4, said furfuryl alcohol and said formaldehyde being present in a ratio of about 1/10 to 2 mols of formaldehyde per mol of furfuryl alcohol, said condensation taking place with the continuous removal of the water of reaction by the aid of an aromatic volatile hydrocarbon.

10. The method as defined in claim 9 in which the hydrocarbon is benzene.

References Cited in the file of this patent
UNITED STATES PATENTS

| | | |
|---|---|---|
| 2,343,972 | Harvey | Mar. 14, 1944 |
| 2,601,497 | Brown | June 24, 1952 |